A. J. ANDERSON.
MOWING MACHINE.
APPLICATION FILED OCT. 17, 1911.

1,049,190.

Patented Dec. 31, 1912.
2 SHEETS—SHEET 2.

WITNESSES
John a Bergstrom
L. J. Gallagher

INVENTOR
Axel J. Anderson
BY Munn & Co
ATTORNEYS

UNITED STATES PATENT OFFICE.

AXEL J. ANDERSON, OF EAST HAMPTON, CONNECTICUT.

MOWING-MACHINE.

1,049,190.   Specification of Letters Patent.   Patented Dec. 31, 1912.

Application filed October 17, 1911. Serial No. 655,131.

*To all whom it may concern:*

Be it known that I, AXEL J. ANDERSON, a citizen of the United States, and a resident of East Hampton, in the county of Middlesex and State of Connecticut, have invented a new and Improved Mowing-Machine, of which the following is a full, clear, and exact description.

My invention relates generally to mowing machines and more particularly it is directed to one which is self-propelled and provided with new and useful means for controlling the cutter bar frame.

The principal object of my invention is to provide a mowing machine having a plurality of bars thereon, the frame carrying the bars being more or less loosely constructed whereby these bars may adapt themselves to unevenness in the ground when the machine is in use.

A further object of the invention is to provide a mowing machine having a new and improved means for removing the cutter bar driving mechanism out of operative position in order to permit the machine to be run over the ground with the bars inoperative.

Other objects and advantages of the invention will appear as the description thereof proceeds, the new and novel features thereof being fully set forth in the appended claims.

Reference is to be had to the accompanying drawings forming a part of this specification, in which similar characters of reference denote corresponding parts in all the views, and in which—

Figure 1:
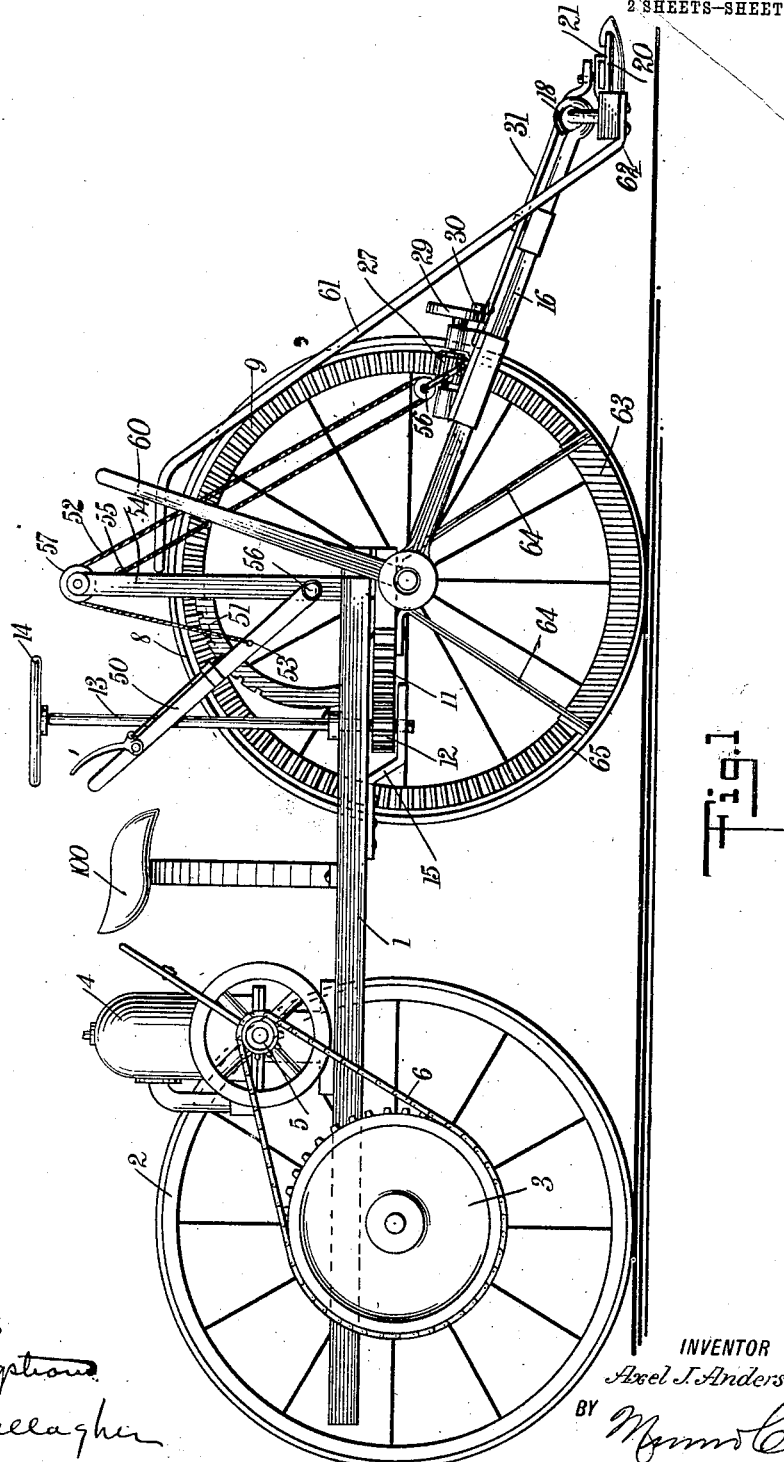
Figure 2:
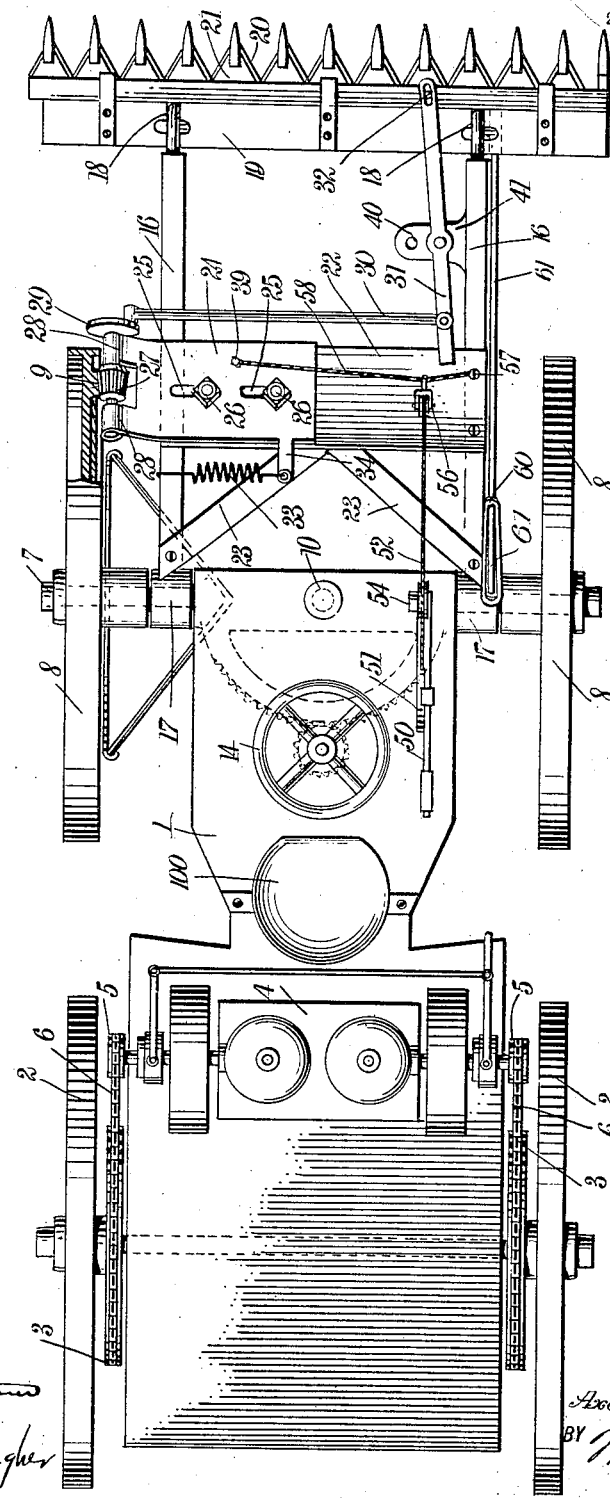

Figure 1 is a side view of the machine, and Fig. 2 is a top plan view thereof, partly in section.

Any suitable frame 1 is provided with the rear traction wheels 2, each wheel being provided with a suitable sprocket 3; a motor 4 of any desired type is preferably mounted on the rear of the supporting frame 1 and is provided with a plurality of sprocket wheels 5, there being suitable chains 6 engaging each sprocket 3 and 5 at opposite sides of the frame whereby operation of the engine serves to propel the outfit. Located forwardly of the machine on a suitable axle 7 are the wheels 8, one of the wheels being provided on its inner side with teeth 9 adapted for engagement with a suitable pinion to be later described; the axle 7 is pivotally mounted in any suitable manner, at 10, on the supporting frame 1, the axle being provided with a quadrant 11 adjacent the under side of the frame 1 with which a pinion 12 is adapted to mesh, this pinion being carried by a vertically extending rod having a steering wheel 14 at its upper end; any suitable or desired means may be used to support the pinion 12, the preferred form, however, being an offset strap 15, as shown particularly in Fig. 1.

Extending forwardly of the machine and pivotally mounted on the axle 7 are the arms 16, the inner ends 17 of which contain suitable openings through which the axle passes, the forward ends of these arms being preferably provided with hinges 18 adapted to support a suitable cutting device 19 made up of the fixed bar and movable bar 20, 21. Intermediate of the length of the arms 16 is a supporting member 22 secured at its outer ends to the arms, the construction being further braced by means of suitable diagonals 23, as shown particularly in Fig. 2.

Movably mounted on top of the supporting member 22 is a plate or equivalent device 24 having slots 25 therein, there being suitable bolts or pins 26 extending upwardly from the supporting member 22 through these slots whereby the movement of the plate on the member is guided; the outer end of the plate carries a pinion 27 mounted in suitable bearings 28, this pinion being adapted to mesh with the teeth 9 on the inside of the wheel 8. The turning of the pinion as the machine is drawn over the ground actuates the cutter bar 20, by any suitable means, but preferably by means of a crank 29 mounted on the same shaft as the pinion 27, this crank actuating a link 30 connected to one end of a pivoted lever 31, the other end of the lever being in engagement with the cutter bar by means of a pin and slot connection 32. This lever is pivotally mounted at an intermediate point in one of the openings 40 in the lug 41 carried by the arm 16.

The plate 24 is maintained in its outer position with the pinion 27 in engagement with the teeth 9 by means of a suitable spring 33, one end of which is secured to one of the arms 16, the other end being in engagement with a lug 34 carried by the plate 24.

As the machine is moved over the ground the rotation of the wheel 8 will turn the pinion 27 which in turn will move the link 30 and the lever 31, thereby reciprocating the cutter bar, this bar together with the guard fingers on bar 21 extending downward toward the ground and being held in adjusted position with relation thereto by means to be presently described. In order to provide for movement of the machine over the ground with the cutters in inoperative position I have provided suitable means for moving the pinion 27 out of engagement with the teeth 9 on the wheel 8, these means comprising a lever 50 having a pawl and ratchet 51, together with a cord or chain 52 engaging therewith and also with the movable members carrying the cutter bars. The lever is supported at one end by the post 54, the quadrant 51 being suitably supported on the frame 1. The upper end of the post is provided with a pulley 57, the cord or chain 52 having one of its ends secured to the lever at 53 and passing over this pulley, the other end being secured to the post 54 at 55. Extending longitudinally of the supporting member 22 is another cord or chain 58 having one end secured at 57 to this member, the other end being secured at 39 to the plate 24. A pulley 56 is suitably secured to the cord 58 at a point intermediate of its length, the before-mentioned cord 52 passing around the pulley. The height of the post 54 and the length of the lever 50 and cord 52 is such that by pulling backwardly on the lever the arms 16 are elevated, thereby carrying the cutter bars away from the ground, movement of the lever also moving the plate 24 which brings the pinion 27 out of engagement with the teeth 9 on the traction wheel 8.

It is to be particularly noted that the cutting mechanism is hingedly suspended on the ends 18 of the arms 16, these arms being movably mounted on the axle 7 so that a limited movement of one arm relatively to the other is freely permitted whereby as the machine goes over the ground one end of the cutter bars may lie at a greater or lesser height than the other end, thereby providing for efficient operation on rough, irregular ground.

Since the cutting device 19, at the forward ends of the arms 16, is hingedly mounted in position, it is desirable that the position thereof be fixed when the machine is in use and to this end I provide suitable means; pivoted to and extending upwardly from one of the arms 16 is a post 60 having a tapering opening extending therethrough, into which one end of the brace 61 extends; the thickness of the brace is greater than the width of one end of the opening and less than the width of the other end thereof. The forward end 62 of the brace is secured to the cutting device as shown in Fig. 1 and, by securing the upper end of the brace 23, the cutting mechanism to which it is attached may be determined, the upper end of the brace 23 being adapted to be frictionally held secured within the tapering opening in the lever 60 whereby the adjustment of the parts may be quickly obtained.

In the operation of the machine through soft ground the teeth 9 on the inside of the wheel 8 may become filled with soil and in order to prevent or lessen this I make use of a suitable cover 63 secured at the outer ends of suitable arms 64 which have their upper ends in engagement with the axle 7; this cover 63 is preferably of the shape shown in Fig. 1, the curvature of the sides thereof being equal to that of the wheel 8 so that as the wheel is drawn over the ground the entrance of soil into the teeth is prevented, the operation of the cover being facilitated, possibly, by providing the inside of this wheel 8 with a peripheral flange 65 against which the lower side of the cover closely fits.

A seat 100 is preferably provided on the supporting frame 1, the location of the seat being adjacent the regulating mechanism of the engine and also in close proximity to the steering wheel 14 and the lever and ratchet 50 in order to bring the means for controlling all of the parts of the machine within the grasp of the driver. The size of the different parts may be varied and the material of which they are made will depend largely upon the finish of the machine desired, such changes being included in the spirit of the appended claims.

Having thus described my invention, I claim as new, and desire to secure by Letters Patent:—

1. A mowing machine comprising a frame, wheels on the frame, one of the wheels being provided with teeth, arms extending forwardly of the frame and movably mounted in position, a cutting mechanism suspended at the outer ends of the arms, a supporting member in engagement with the arms, a plate movably mounted on the supporting member, a pinion carried by the plate, the pinion being adapted to engage the teeth on the said wheel, means actuated by the pinion and in engagement with the cutting bar of the said mechanism, whereby the mechanism may be operated, and movable means engaging the said plate, whereby the plate may be moved to carry the pinion out of engagement with the said teeth.

2. A mowing machine comprising a frame, wheels on the frame, one of the wheels being provided with teeth, arms extending forwardly of the frame and movably mounted in position, a cutting mechanism hingedly suspended at the outer ends of the arms, a supporting member in engagement with the arms, pins carried by the member, a plate having slots therein mounted on the member, the said pins engaging in the said slots, a pinion carried by the plate, the pinion being adapted to engage the teeth on the said wheel, means actuated by the pinion and in engagement with the cutting bar of the said mechanism whereby the mechanism may be operated, movable members engaging the plate one of the arms and the said frame whereby the plate may be moved to carry the pinion out of engagement with the said teeth and the arms of the cutting mechanism may be lifted from the ground.

3. A mowing machine comprising a frame, wheels on the frame, one of the wheels being provided with a plurality of teeth, a plurality of arms extending forwardly of the frame, a supporting member engaging the arms, a cutting mechanism mounted at the outer ends of the arms, a plate on the said supporting member, a shaft carried by the plate, a pinion on the shaft, a crank on the shaft, means between the crank and the cutter bar of the said mechanism whereby the same may be operated, together with means carried by the supporting member and engaging the plate for holding it in position thereon, means engaging the plate and one of the arms for holding the pinion in engagement with the said teeth on the wheel, and means engaging the plate one of the arms and the frame, whereby the plate may be moved to carry the pinion out of engagement with the said teeth and lift the cutting mechanism from the ground.

4. A mowing machine comprising a frame, wheels on the frame, teeth on one of the wheels, a plurality of arms carried by the frame and extending forwardly thereof, a cutting mechanism mounted at the outer ends of the arms, a supporting member in engagement with the arms, pins extending upwardly from the said member, a plate having slots therein, the said pins passing through the said slots, a shaft carried by the plate, a pinion on the shaft, a crank on the shaft, means between the crank and the cutter bar of the cutting mechanism whereby turning of the pinion will operate the said bar, a spring engaging one of the arms and the said plate for holding the pinion in engagement with the teeth on the said wheel, and means engaging the plate for moving it in order to carry the pinion out of engagement with the said teeth and also for lifting the said arms in order to carry the cutting mechanism away from the ground.

5. A mowing machine comprising a frame, wheels on the frame, one of the wheels being provided with a plurality of teeth, arms extending forwardly of the frame, a cutting mechanism at the ends of the arms, a supporting member engaging the arms, a plate on the said member, a shaft carried by the plate, a pinion on the shaft, a crank on the shaft, a pitman engaging the crank, a lever engaging the cutter bar of the said mechanism and also engaging the said pitman, a spring engaging one of the arms and the said plate for maintaining the pinion in engagement with the teeth on the wheel whereby the cutting device is actuated as the machine travels over the ground, together with an element engaging the said plate, and other means engaging the said element, movement of which brings the pinion on the plate out of engagement with the teeth on the wheel and lifts the cutting mechanism from the ground.

6. A mowing machine comprising a frame, wheels on the frame, one of the wheels being provided with a plurality of teeth, a plurality of arms extending forwardly of the frame and movably mounted in position, a cutting mechanism suspended at the outer ends of the arms, a supporting member engaging the arms, pins extending upwardly from the supporting member, a plate having slots therein, the plate being carried by the supporting member with the pins passing through the slots, a shaft carried by the plate, a pinion on the shaft, a crank also on the shaft, a pitman in engagement with the crank, a lever carried by one of the arms, the lever engaging the cutter bar of the said mechanism and also engaging the said pitman whereby the cutter bar is actuated as the machine travels over the ground, a spring engaging the plate and one of the arms for maintaining the pinion in engagement with the said teeth on the wheel, a flexible member engaging the plate one end of the flexible member being fixed, a post carried by the frame, a lever carried by the post, together with a flexible member engaging the lever and the first flexible member, movement of the lever bringing the pinion out of engagement with the teeth on the wheel and lifting the cutting mechanism from the ground.

In testimony whereof I have signed my name to this specification in the presence of two subscribing witnesses.

AXEL J. ANDERSON.

Witnesses:
KARL E. CLOSSON,
FRED. H. BARTON.